(12) United States Patent
Yoshida et al.

(10) Patent No.: US 7,593,176 B2
(45) Date of Patent: Sep. 22, 2009

(54) CONTROL APPARATUS AND STORAGE DEVICE

(75) Inventors: Osamu Yoshida, Kawasaki (JP); Shunsuke Aoki, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 226 days.

(21) Appl. No.: 11/586,830

(22) Filed: Oct. 26, 2006

(65) Prior Publication Data

US 2007/0291388 A1     Dec. 20, 2007

(30) Foreign Application Priority Data

Jun. 15, 2006    (JP) .............................. 2006-166611

(51) Int. Cl.
*G11B 27/36*    (2006.01)

(52) U.S. Cl. ....................................................... 360/31

(58) Field of Classification Search ................... 360/39, 360/75, 31, 51, 48, 65; 714/795; 375/341, 375/340, 232, 376; 369/53.12, 59.21, 53.16, 369/59.23; 348/732
See application file for complete search history.

(56) References Cited

U.S. PATENT DOCUMENTS

| | | | |
|---|---|---|---|
| 5,168,413 A | | 12/1992 | Coker et al. |
| 5,430,768 A | * | 7/1995 | Minuhin et al. ............. 375/340 |
| 5,598,228 A | * | 1/1997 | Saitoh ......................... 348/732 |
| 5,954,837 A | * | 9/1999 | Kim ............................. 714/795 |
| 6,570,940 B2 | * | 5/2003 | Yamaguchi et al. ......... 375/341 |
| 6,771,442 B2 | * | 8/2004 | Bliss et al. .................... 360/39 |
| 6,934,233 B2 | * | 8/2005 | Miyashita et al. ......... 369/53.16 |
| 6,937,551 B2 | * | 8/2005 | Miyashita et al. ......... 369/53.16 |
| 7,031,090 B2 | * | 4/2006 | Ichihara et al. ............... 360/65 |
| 7,107,513 B1 | * | 9/2006 | Yamauchi .................... 714/795 |
| 7,110,199 B2 | * | 9/2006 | Sugawara et al. ............. 360/48 |
| 7,440,372 B2 | * | 10/2008 | Nakano et al. ........... 369/53.12 |
| 7,440,522 B2 | * | 10/2008 | Minemura ................... 375/341 |
| 2004/0257954 A1 | * | 12/2004 | Ohkubo et al. ........... 369/59.21 |
| 2006/0176947 A1 | * | 8/2006 | Lim .............................. 375/232 |
| 2006/0181797 A1 | * | 8/2006 | Sugawara et al. ............. 360/51 |
| 2006/0203949 A1 | * | 9/2006 | Minemura et al. .......... 375/376 |
| 2007/0121464 A1 | * | 5/2007 | He ............................ 369/59.23 |

FOREIGN PATENT DOCUMENTS

JP    5-81807         4/1993
JP    2004-342168    12/2004

* cited by examiner

*Primary Examiner*—Fred Tzeng
(74) *Attorney, Agent, or Firm*—Greer, Burns & Crain, Ltd.

(57) ABSTRACT

A control apparatus performs, when reading predetermined data stored in a storage medium, a correction of a signal read by a head during a Viterbi decoding process of the signal. A signal-quality-value calculating unit calculates a signal quality value of the signal based on a status of the correction during the Viterbi decoding process. A signal-quality-value storing unit stores the calculated signal quality value in a storage area.

14 Claims, 8 Drawing Sheets

| OFFSET | DATA CONTENTS |
|---|---|
| 0 | LIFE TIME DURING MEASUREMENT |
| 1 | TEMPERATURE DURING MEASUREMENT |
| 2 | AVERAGE SIGNAL QUALITY VALUE |
| 3 | MAXIMUM SIGNAL QUALITY VALUE |
| 4 | MINIMUM SIGNAL QUALITY VALUE |

CONTROL APPARATUS AND STORAGE DEVICE

BACKGROUND OF THE INVENTION

1. Field of the Invention

The present invention relates to a storage device and a control apparatus of the storage device that carry out, during a Viterbi decoding process, a correction of read signals that are read from a head when reading predetermined data that is stored in the storage medium.

2. Description of the Related Art

A storage device that stores data (for example, a magnetic disk device, a magneto optical disk device, an optical disk device etc.) commonly includes a structure that includes a function called a failure prediction function such that upon determining that the storage device is in a condition that is likely to cause occurrence of a failure (occurrence of a failure in a head or a circuit inside the storage device), the storage device itself issues a warning to a host device (see, for example, Japanese Patent Application Laid-open No. 2004-342168).

For example, as shown in FIG. 9, during execution of a read process of data by a magnetic disk device 1, read signals that are read by a head 14 are subjected to a Viterbi decoding process inside a read channel 6 and sent to a format control unit 5. Next, the format control unit 5 checks whether the received data includes an error, and attempts a correction if the data includes an error (error correcting code (ECC) process). If the ECC process cannot correct the error, the format control unit 5 attempts a retry as a read error. Based on a number of retries and a total number of sectors that are subjected to a retry process, the format control unit 5 calculates an error rate, and if the error rate exceeds a predetermined threshold, the format control unit 5 issues a report (see FIG. 10) to the host device that is connected via a host interface (IF) etc.

However, in the conventional technology, occurrence of the read error cannot be predicted beforehand and avoided. In other words, in the conventional technology, calculation of the error rate that leads to the storage device notifying the host device of the warning of occurrence of failure is based on occurrence of the read error. Because notification of the warning to the host device is carried out after the read error has occurred, occurrence of the read error cannot be predicted beforehand and avoided.

SUMMARY OF THE INVENTION

It is an object of the present invention to at least partially solve the problems in the conventional technology.

A control apparatus according to one aspect of the present invention performs, when reading predetermined data stored in a storage medium, a correction of a signal read by a head during a Viterbi decoding process of the signal. The control apparatus includes a signal-quality-value calculating unit that calculates a signal quality value of the signal based on a status of the correction during the Viterbi decoding process; and a signal-quality-value storing unit that stores the calculated signal quality value in a storage area.

A storage device according to another aspect of the present invention performs, when reading predetermined data stored in a storage medium, a correction of a signal read by a head during a Viterbi decoding process of the signal. The storage device includes a signal-quality-value calculating unit that calculates a signal quality value of the signal based on a status of the correction during the Viterbi decoding process; and a signal-quality-value storing unit that stores the calculated signal quality value in a storage area.

A method according to still another aspect of the present invention is for performing, when reading predetermined data stored in a storage medium, a correction of a signal read by a head during a Viterbi decoding process of the signal. The method includes calculating a signal quality value of the signal based on a status of the correction during the Viterbi decoding process; and storing the calculated signal quality value in a storage area.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail with reference to the accompanying drawings. A magnetic disk device that includes a control apparatus according to the present invention is explained as a first embodiment of the present invention, and other embodiments of the present invention are explained next.

An outline, a salient feature, a structure, and a process of the magnetic disk device according to the first embodiment are explained below, and effects due to the first embodiment are explained in the end.

Figure 1:
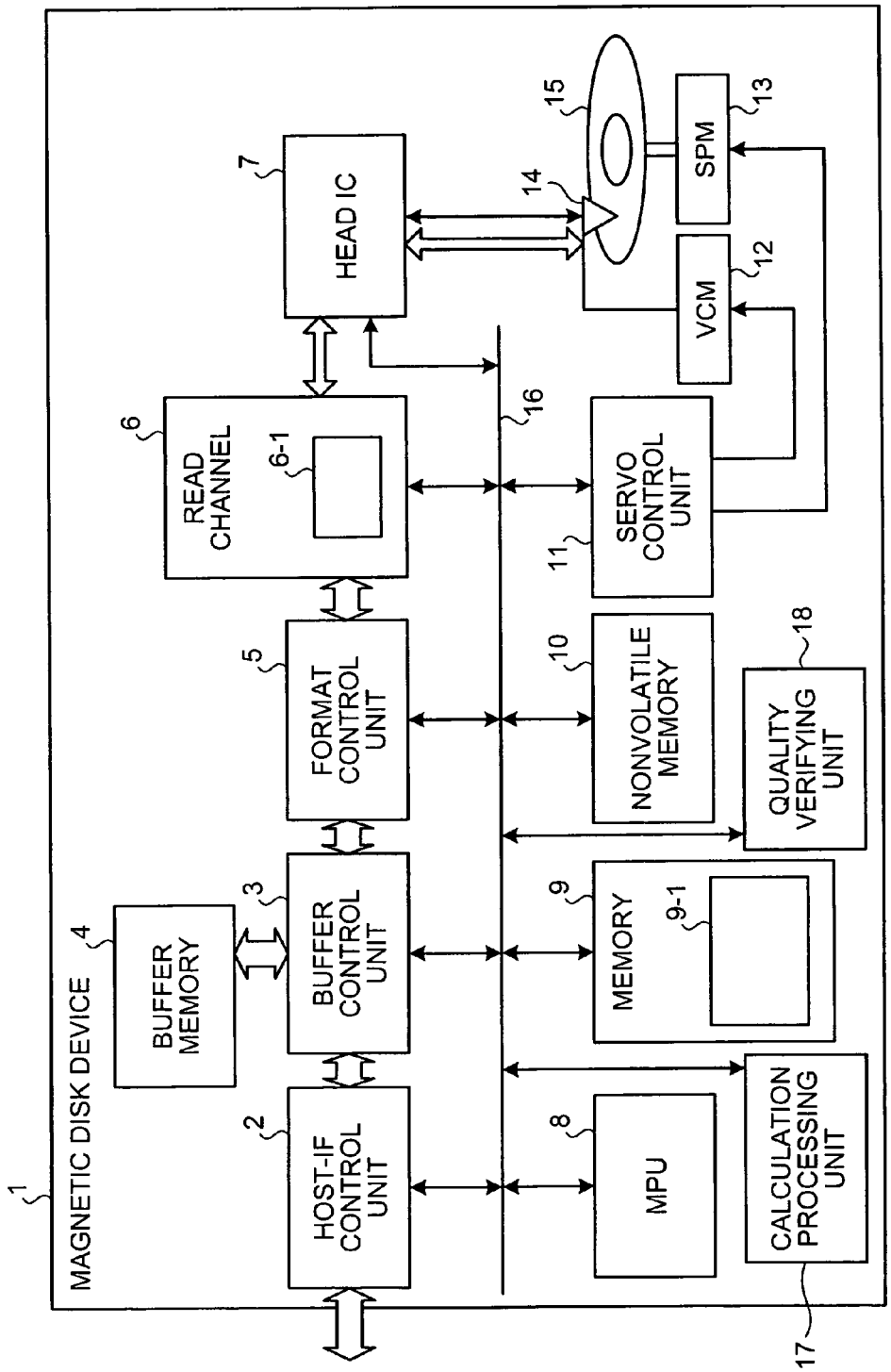
FIG. 1 is a block diagram of an outline of a magnetic disk device according to a first embodiment of the present invention.

First, the outline and the salient feature of the magnetic disk device according to the first embodiment are explained with reference to FIG. 1. FIG. 1 is a block diagram of the outline of the magnetic disk device according to the first embodiment.

The magnetic disk device according to the first embodiment includes the structure shown in FIG. 1. When reading predetermined data that is stored in a storage medium, the magnetic disk device monitors a correction status during a Viterbi decoding process of read signals that are read from a head. According to the salient feature of the magnetic disk device, before actual occurrence of a read error, the magnetic disk device grasps whether the magnetic disk device is in a condition is likely to cause occurrence of a failure from a quality of signals that are fetched from the head.

The salient feature is explained in detail. Upon receiving a self-diagnosis command from a host, a magnetic disk device 1 executes a self-diagnosis test to determine whether the head 14 is in a condition that is likely to cause occurrence of a failure. By receiving the self-diagnosis command from the host and carrying out the self-diagnosis test, the magnetic disk device 1 can execute the self-diagnosis test at a random timing.

Figure 6:
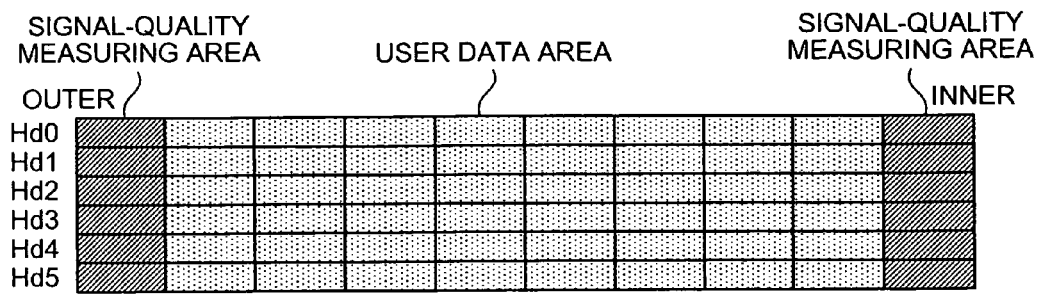
FIG. 6 is a schematic of an area structure of the disk medium.

In the self-diagnosis test, test data is written to a signal quality measuring area (for example, see FIG. 6) that is included separately from a user data area inside a disk medium 15. The written test data is read for a predetermined number of times, and read by the head 14. A number of corrections are fetched during the Viterbi decoding process of the read signals that are input into the read channel 6 via a head integrated circuit (IC) 7, and signal quality values that indicate a quality of the signals fetched from the head 14 are calculated. Further, in the self-diagnosis test, during user use environment and manufacturing of the magnetic disk device 1 (before factory shipment), the head 14 and zones and temperature conditions of the disk medium 15 are changed such that the test data of a hundred sectors is read repeatedly for ten times. In other words, by executing the self-diagnosis test for the head 14, for each zone of the disk medium 15, or for different temperature conditions, the signal quality values, which indicate the quality of the signals that are read from the head 14, are calculated by adding multiple factors such as a difference of read frequency, a difference of device environment etc.

Calculation of the signal quality is explained in detail. The magnetic disk device 1 stores in a register 6-1 included inside the read channel 6, a number of corrections during the Viterbi decoding process that is carried out for each reading of the data in the read channel 6. Before reading the test data, the magnetic disk device 1 clears a counter value of the register 6-1, and reads for a predetermined number of times the test data that is written to the signal quality measuring area. After the reading of the test data is finished, the magnetic disk device 1 fetches from the register 6-1 each counter value that indicates the number of corrections of the Viterbi decoding process. Next, the magnetic disk device 1 treats as signal quality values, a number of corrections of the test data of ten sectors by converting the number of corrections during the Viterbi process that are fetched by reading the test data of a hundred sectors and calculates signal quality values for the number of readings (for example, ten times) of the test data. Next, the magnetic disk device 1 temporarily stores the data of calculated signal quality values in an area 9-1 inside a memory 9.

Figures 2, 3:
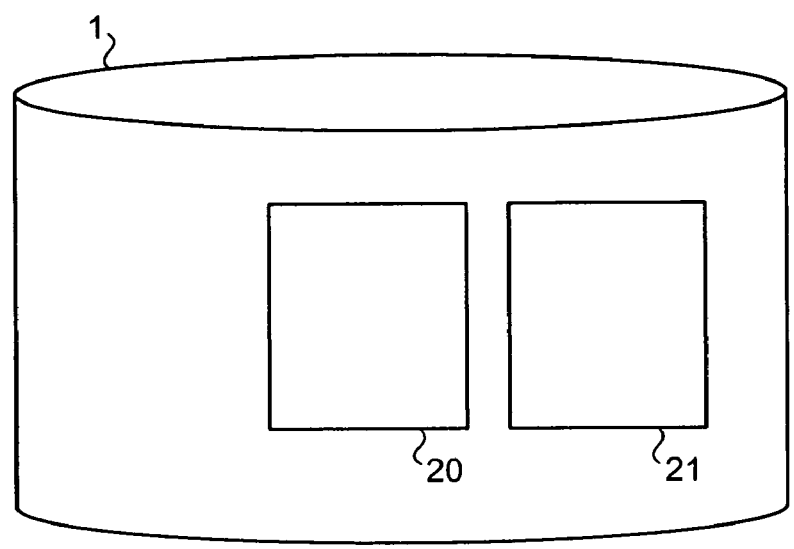
FIG. 2 is an example of data that is recorded in a disk medium.
FIG. 3 is an example of a recording format of measured data.

From the signal quality values which are stored in the area 9-1 of the memory 9 as a result of the self-diagnosis test during the user use environment, the magnetic disk device 1 calculates an average value of the signal qualities, fetches a maximum value and a minimum value, and stores the average value and the fetched minimum and the maximum values in a system area 20 of the disk medium 15 (see FIG. 2). Similarly, the magnetic disk device 1 stores a result of the self-diagnosis test during manufacturing (before factory shipment) of the magnetic disk device 1 in a system area 21 of the disk medium 15 (see FIG. 2). In other words, the signal quality values are calculated by executing the self-diagnosis test during manufacturing to get a standard to verify whether the quality of the read signals that are read by the head 14 is degrading. Further, as shown in FIG. 3, a lifetime (usage time such that a usage time in the self-diagnosis test during manufacturing is 0), a temperature during measurement (test), an average of the signal quality values, Max (the maximum value) and Min (the minimum value) of the signal quality values are recorded in the system area 20 and the system area 21 of the disk medium 15. Apart from the aforementioned entries, the signal qualities for each self-diagnosis test and a sum total of the signal quality values can also be recorded.

Based on the self diagnosis test results that are stored in the system area 20 and the system area 21 of the disk medium 15, the magnetic disk device 1 verifies at an appropriate timing (for example, after executing the self-diagnosis test for several times) whether the signals that are fetched from the head 14 are degrading, and upon determining that a warning is necessary, notifies a warning to the host. In other words, the magnetic disk device 1 prior notifies a warning to the host before actual occurrence of a read error.

Figure 8:
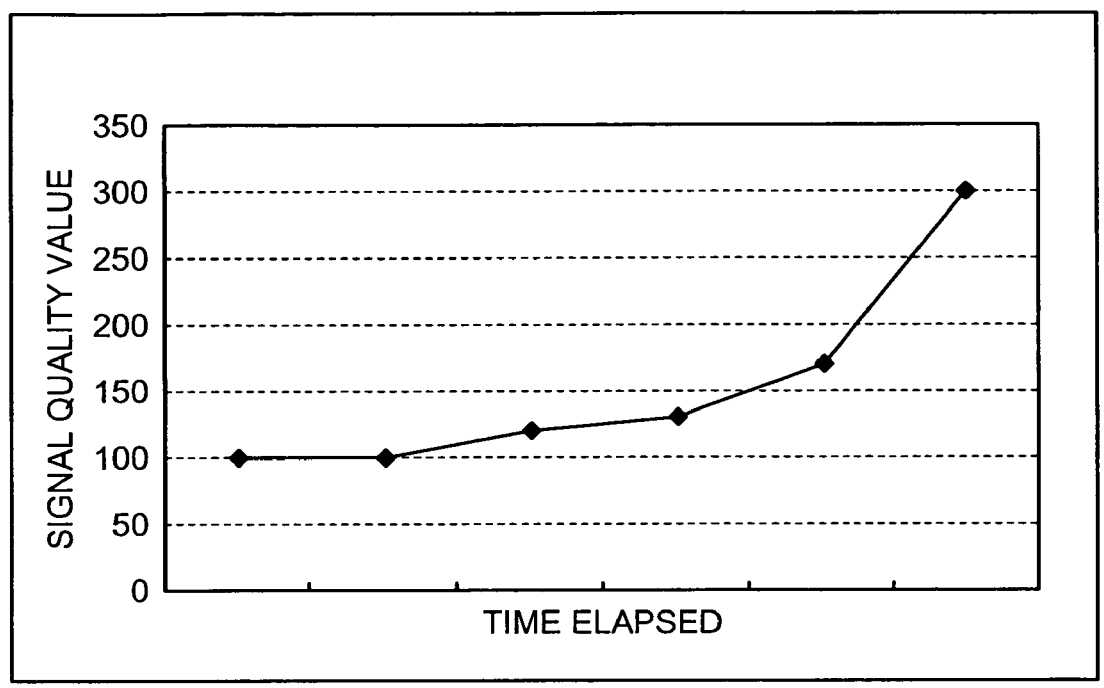
FIG. 8 is a graph for showing a sign of degradation of signal quality.
Figure 9:
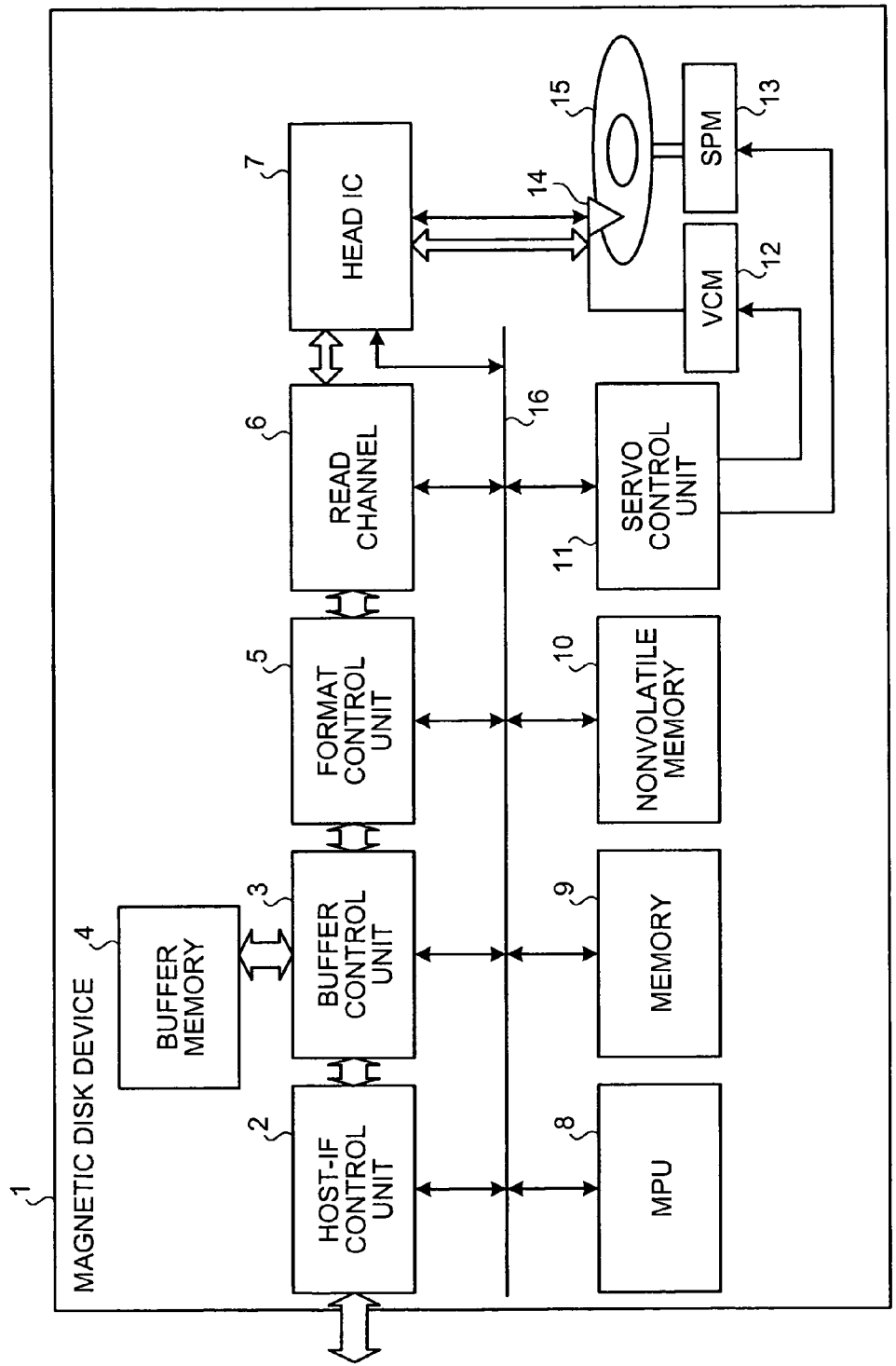
FIG. 9 is a block diagram of a conventional structure of a magnetic disk device.
Figure 10:
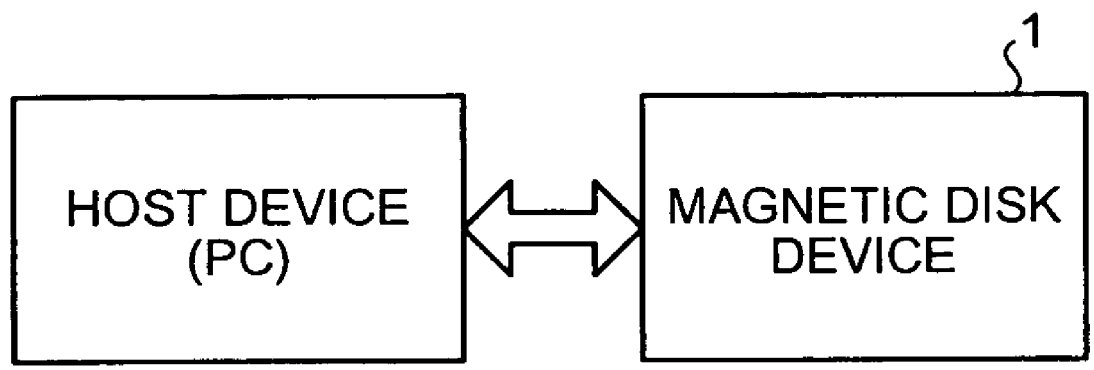
FIG. 10 is a block diagram of a connection between a host device and the magnetic disk device.

To be specific, as shown in FIG. 8, based on a result of the current self-diagnosis test and results of previously executed self-diagnosis tests, the magnetic disk device 1 creates a graph that includes the signal quality values (for example, the average value or the sum total of the signal qualities etc.) and the usage time in the user environment of the magnetic disk device 1. If the signal quality fetched from the head 14 is degrading (if an inclination of the graph is increasing with respect to successive executions of the self-diagnosis test), the magnetic disk device 1 determines that a warning is necessary, and notifies a warning (a warning to the effect that the magnetic disk device 1 is in a condition that is likely to cause occurrence of a failure) to the host.

The magnetic disk device 1 can also determine that a warning is necessary and notify the warning to the host if the signal quality fetched from the head 14 is degrading and the sum total of the signal quality values is exceeding a predetermined threshold.

Thus, due to the aforementioned salient feature, the magnetic disk device 1 according to the first embodiment can grasp, from the quality of the signals fetched from the head 14, whether the magnetic disk device 1 is in a condition that is likely to cause occurrence of a failure before actual occurrence of the read error.

Next, the structure of the magnetic disk device 1 according to the first embodiment is briefly explained with reference to FIG. 1.

As shown in FIG. 1, the magnetic disk device 1 according to the first embodiment includes a host-IF control unit 2 that controls communication related to various types of data transacted between the host and the magnetic disk device 1, a buffer control unit 3 that controls a buffer memory 4, the buffer memory 4 that temporarily stores therein the data that is transacted between the host and the magnetic disk device 1 via the host-IF control unit 2, the format control unit 5 that controls reading of the data by carrying out error check etc. of Non Return to Zero (NRZ) data (digital data) that is fetched from the read channel 6 during reading of the data, the read channel 6 that carries out the Viterbi decoding process on the signals from the head 14 that are input from the head IC 7 during reading of the data and generates the NRZ data, the head IC 7, a micro processor unit (MPU) 8 that carries out main control of the magnetic disk device 1, the memory 9 and a nonvolatile memory 10 that store therein control data and control programs (firmware), a servo control unit 11 that controls operations of a voice coil motor (VCM) 12 and a spindle motor (SPM) 13, the VCM 12, the SPM 13, the head 14, the disk medium 15, a common bus 16, a calculation processing unit 17, and a quality verifying unit 18. The MPU 8, the memory 9, the disk medium 15, the calculation processing unit 17, and the quality verifying unit 18 are closely related to the present invention.

The MPU 8 uses a predetermined program (firmware program) to carry out main control of the magnetic disk device 1. To be specific, the MPU 8 carries out control such as process control of the self-diagnosis test, control to temporarily store in the area 9-1 of the memory 9 the data of the signal quality values that are calculated by the calculation processing unit 17, and control to notify a warning to the host according to a verification result of the signal qualities by the quality verifying unit 18.

Apart from the control data and the control programs that are necessary for various processes in the magnetic disk device 1, the signal quality values calculated by the calculation processing unit 17 and data of the self-diagnosis test results that are finally recorded in the disk medium 15 are temporarily recorded in the area 9-1 of the memory 9.

Apart from various types of user data and system data, the self-diagnosis test results during the user use environment and during manufacturing (before factory shipment) of the magnetic disk device 1 are recorded in the disk medium 15. For example, as shown in FIG. 3, the lifetime (usage time such that the usage time in the self-diagnosis test during manufacturing is 0), the temperature during estimation (test), the average of the signal quality values, Max (the maximum value) and Min (the minimum value) of the signal quality values are recorded in the system area 20 and the system area 21 as the results of the self-diagnosis tests. Apart from the aforementioned entries, the signal quality values for each self-diagnosis test and the sum total of the signal quality values can also be recorded in the disk medium 15.

The calculation processing unit 17 is included as a part of a program module of the firmware program. During execution of the self-diagnosis test, the calculation processing unit 17 calculates the signal quality that indicates the quality of the read signals that are read by the head 14 in the read channel (reading circuit) 6. To be specific, for every reading of the test data in the self-diagnosis test, the calculation processing unit 17 fetches from the register 6-1 the counter value that is the number of corrections of the Viterbi decoding process. Next, for example, the calculation processing unit 17 treats as the signal quality values, the number of corrections of the test data of ten sectors by converting the number of corrections during the Viterbi process that are fetched by reading the test data of a hundred sectors, and calculates the signal quality values for the number of readings (for example, ten times) of the test data. Next, the MPU 8 exercises control to temporarily store in the area 9-1 of the memory 9 the data of the signal quality values that are calculated by the calculation processing unit 17.

From the signal quality values which are stored in the area 9-1 of the memory 9, the calculation processing unit 17 calculates the average value of the signal quality, fetches the maximum value and the minimum value, and the MPU 8 exercises control to store the data fetched by the calculation processing unit 17 in the system area 20 of the disk medium 15 (see FIG. 2). Similarly, the MPU 8 exercises control to store the data fetched by the calculation processing unit 17 during execution of the self-diagnosis test during manufacturing (before factory shipment) of the magnetic disk device 1 in the system area 21 of the disk medium 15 (see FIG. 2).

Apart from calculating the signal quality values that indicate the quality of the signals read by the head 14 based on the number of corrections during the Viterbi decoding process carried out by the read channel 6, the calculation processing unit 17 can also calculate, based on a quality monitor (QM) value (a value that is commonly fetched and used in settings of the device during manufacturing) that is commonly recorded in the magnetic disk device 1, the signal quality values not only from the number of corrections during the Viterbi process, but also by adding other factors.

The quality verifying unit 18 is included as a part of the program module of the firmware program. Based on the self diagnosis test results that are stored in the system area 20 and the system area 21 of the disk medium 15, the quality verifying unit 18 verifies at an appropriate timing (for example, after executing the self-diagnosis test for several times) whether the signals that are input into the read channel 6 from the head 14 via the head IC 7 are degrading. To be specific, as shown in FIG. 8, based on the result of the current self-diagnosis test and the results of previously executed self-diagnosis tests, the quality verifying unit 18 creates the graph that includes the signal quality value (for example, the average value or the sum total of the signal quality values etc.) and the usage time in the user environment of the magnetic disk device 1. If the quality of the signals read by the head 14 is degrading (if the inclination of the graph is increasing with respect to successive executions of the self-diagnosis test), the MPU 8 determines that a warning is necessary, and notifies the warning to the host.

If the quality of the signals read by the head 14 is degrading, the quality verifying unit 18 can also verify whether the sum total of the signal quality values is exceeding the predetermined threshold. If the sum total of the signal quality values is exceeding the predetermined threshold, the MPU 8 can determine that a warning is necessary and notify the warning to the host.

Figure 4:
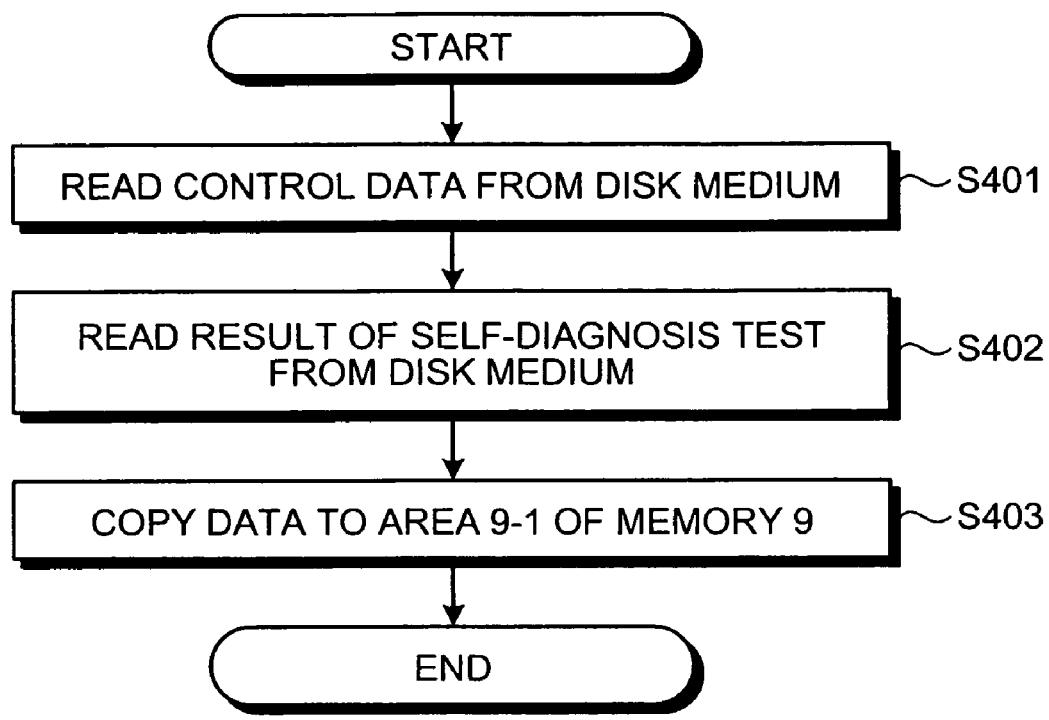
FIG. 4 is a flowchart of a sequence during power activation.

A process during power activation of the magnetic disk device 1 according to the first embodiment is explained with reference to FIG. 4. FIG. 4 is a flowchart of a sequence during the power activation of the magnetic disk device 1 according to the first embodiment. As shown in FIG. 4, the magnetic disk device 1 reads the control data from the disk medium 15 (step S401), and stores the read control data in the memory 9. Next, the magnetic disk device 1 reads the results of the self-diagnosis tests from the disk medium 15 (step S402) and expands data of the results of the self-diagnosis tests to the area 9-1 of the memory 9 (step S403).

A data expansion process of the results of the self-diagnosis tests can also be omitted by storing the results of the self-diagnosis tests in the nonvolatile memory 10.

Figure 5:
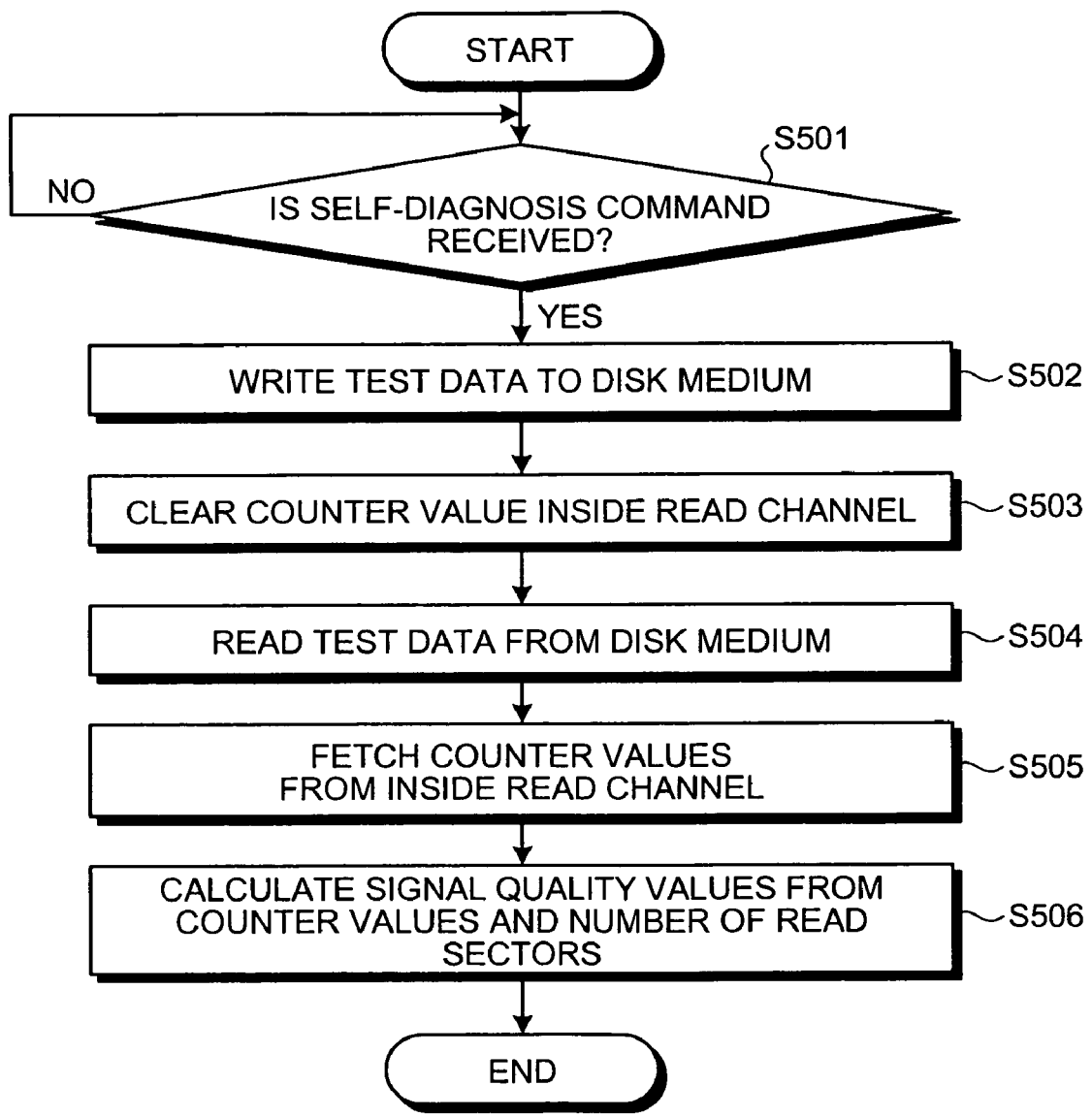
FIG. 5 is a flowchart of a sequence of a process of the magnetic disk device according to the first embodiment.

A signal quality values calculating process of the magnetic disk device 1 according to the first embodiment is explained with reference to FIG. 5. FIG. 5 is a flowchart of a sequence of the process by the magnetic disk device 1 according to the first embodiment. As shown in FIG. 5, upon receiving the self-diagnosis command by the firmware program (Yes at step S501), the MPU 8 of the magnetic disk device 1 writes the test data to the signal quality measuring area (for example, see FIG. 6) that is included separately from the user data area inside the disk medium 15 (step S502).

Next, the calculation processing unit 17, which is included as the program module of the firmware program, clears the counter value of the register 6-1 that is included inside the read channel 6 (step S503), and reads the test data that is written to the signal quality measuring area (step S504). After reading of the test data is finished, the magnetic disk device 1 fetches from the register 6-1 the counter value that indicates the number of corrections of the Viterbi decoding process (step S505).

Next, the calculation processing unit 17 calculates the signal quality values from the counter value and the number of read sectors (step S506). To be specific, the calculation processing unit 17 treats as the signal quality values, the number of corrections of the test data of ten sectors by converting the number of corrections during the Viterbi process that are fetched by reading the test data of a hundred sectors, and calculates the signal quality values (step S506). The magnetic disk device 1 repeatedly executes the process explained at steps S503 to S506 until a read frequency becomes equal to a set read frequency (for example, 10 times) of the self-diagnosis test.

Figure 7:
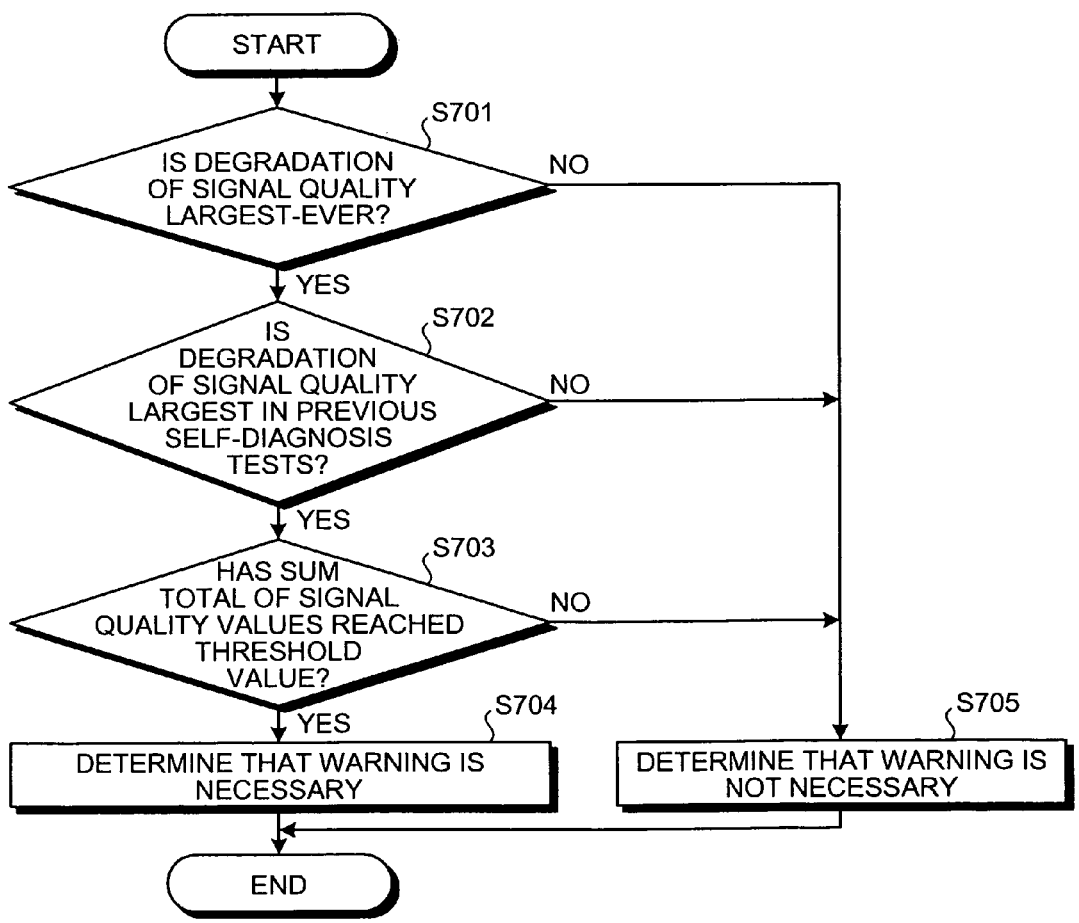
FIG. 7 is a flowchart of a sequence of the process of the magnetic disk device according to the first embodiment.

Next, a signal quality degradation verifying process of the magnetic disk device 1 according to the first embodiment is explained with reference to FIG. 7. FIG. 7 is a flowchart of a sequence of the process of the magnetic disk device 1 according to the first embodiment. The magnetic disk device 1 starts the signal quality degradation verifying process at an appropriate timing (for example, after executing the self-diagnosis test for several times).

As shown in FIG. 7, based on the results of the current self-diagnosis test and the results of previously executed self-diagnosis tests, the quality verifying unit 18 which is included as the program module of the firmware program creates, as shown in FIG. 8, the graph that includes the signal quality values (for example, the average value or the sum total of the signal quality values etc.) and the usage time in the user environment of the magnetic disk device 1. The quality verifying unit 18 uses the graph to verify whether degradation in the signal quality is the greatest (whether the inclination of the graph is the greatest) (step S701).

If the degradation of the signal quality is the greatest (Yes at step S701), the magnetic disk device 1 verifies whether the degradation of the signal quality is also the greatest in the previous self-diagnosis tests (step S702). If the degradation of the signal quality is also the greatest in the previous self-diagnosis tests (Yes at step S702), the quality verifying unit 18 verifies whether the sum total of the signal quality values that are fetched as the results of the self-diagnosis tests exceeds the predetermined threshold (step S703). If the sum total of the signal quality values is exceeding the predetermined threshold (Yes at step S703), the MPU 8 determines that a warning to the host is necessary (step S704), and notifies the warning (a warning to the effect that the magnetic disk device 1 is in a condition that is likely to cause occurrence of a failure) to the not shown host.

Returning to steps S701 to step S703, if the degradation in the signal quality is not the greatest (No at step S701), if the degradation in the signal quality is also not the greatest in the previous self-diagnosis tests (No at step S702), or if the sum total of the signal quality values is not exceeding the predetermined threshold (No at step S703), the magnetic disk device 1 determines that a warning to the host is not necessary (step S705).

According to the first embodiment, based on a correction status during the Viterbi decoding process (a process for decoding the encoded signals that are fetched from the head 14), the magnetic disk device 1 calculates the signal quality values of the read signals that are fetched from the head 14. By substituting the read signal quality with a specific value and storing the specific value, the read signal quality can be used as verification data of the signal quality. Thus, whether the magnetic disk device 1 is in a condition that is likely to cause occurrence of a failure can be grasped from the quality of the read signals from the head 14 before the actual occurrence of a read error.

Furthermore, according to the first embodiment, the signal quality values are calculated based on the number of corrections during the Viterbi decoding process or the QM value (a value that is commonly fetched and used in settings of the device during manufacturing). Thus, the signal quality values of the signals fetched from the head 14 can be calculated by a simple process that counts the number of corrections during the Viterbi decoding process. Similarly, the signal quality values of the read signals from the head 14 can be calculated by using the commonly recorded QM value.

Moreover, according to the first embodiment, the self-diagnosis test is executed for a predetermined number of times on the test data that is written to the signal quality measuring area (test area included for calculation of the signal quality values) included separately than the user data area inside the disk medium 15, and based on the correction status during the Viterbi decoding process related to the self-diagnosis test, the signal quality values are calculated. Thus, the signal quality values of the read signals from the head 14 can be calculated without destroying the user data that is stored in the user data area.

Furthermore, according to the first embodiment, whether the quality of the signals fetched from the head 14 is degrading can be verified based on the stored signal quality values. Thus, before actual occurrence of a read error, whether the magnetic disk device 1 is in a condition that is likely to cause occurrence of a failure can be grasped from the quality of the read signals from the head 14.

Moreover, according to the first embodiment, upon verifying that the quality of the signals fetched from the head 14 is degrading, a warning is notified to the host device. Thus, the host can grasp whether the magnetic disk device 1 is in a condition that is likely to cause occurrence of a failure, and reliability of the magnetic disk device 1 can be increased.

In the self-diagnosis test executed in the first embodiment, writing patterns of the test data that is written to the signal quality measuring area can be changed by selecting at random. Due to this, whether the writing head 14 is in a condition that is likely to cause occurrence of a fault can also be grasped.

The first embodiment of the present invention is explained. However, various modifications other than the representative embodiments can also occur. Other embodiments included in the present invention are explained below.

Execution of the self-diagnosis test by receiving a command from the host is explained in the first embodiment. However, the present invention is not to be thus limited, and the magnetic disk device can also spontaneously and periodically execute the self-diagnosis test. Due to this, the self-diagnosis test can be executed automatically without issuing of the command from the host, and the signal quality values that indicate the quality of the read signals from the host can be appropriately calculated.

Calculating the average value of the signal quality values and fetching the maximum value of the signal quality values is explained in the first embodiment. However, the present invention is not to be thus limited, and for example, reading of the test data of a hundred sectors for ten times can be treated as one set, and from the average values and the maximum values that are obtained by reading for a thousand times, an average value of the average values and a maximum value of the maximum values can be calculated and recorded. Due to this, the signal quality of the read signals from the head can be verified from various perspectives.

The signal quality values, which are calculated in the self-diagnosis test in the first embodiment, can also be transferred to the host. Due to this, the host can minutely verify the quality of the read signals from the head.

Reading of the test data that is written to an area (signal quality measuring area) included separately than the user data area included on the disk medium to calculate the signal quality values is explained in the first embodiment. However, the present invention is not to be thus limited, and upon receiving a read request of the user data, for example, reading of the user data can also be used to calculate the signal quality values. Due to this, the signal quality values can be efficiently calculated using a reading process of the user data. Thus, based on the quality of the read signals from the head, whether the magnetic disk device is in a condition that is likely to cause occurrence of a failure can be grasped for the user data area.

Execution of the self-diagnosis test to calculate the signal quality values is explained in the first embodiment. However, the present invention is not to be thus limited, and the signal quality values can also be calculated by using a process (verifying process) due to a scanning function of the entire user data area that is commonly included in the magnetic disk device. Due to this, before actual occurrence of a read error, based on the quality of the read signals from the head, whether the magnetic disk device is in a condition that is likely to cause occurrence of a failure can be grasped for the entire user data area.

The constituent elements of the magnetic disk device 1 explained in the first embodiment are merely conceptual and may not necessarily physically resemble the structures shown in the drawings. In the first embodiment, a control apparatus according to the present invention is applied to the magnetic disk device 1 that is realized by the firmware program of the MPU 8, however, other structures can also be construed. In other words, the magnetic disk device 1 may not necessarily physically resemble the structures shown in the drawings. For example, the magnetic disk device 1 as a whole or in parts can be broken down or integrated, such as integrating the MPU 8, the calculation processing unit 17, and the quality verifying unit 18, either functionally or physically in accordance with the load or how the device is to be used. Further, the process functions performed by the magnetic disk device 1 (for example, a calculating process function of the signal quality values that is performed by the calculation processing unit 17 or a verifying function of the signal quality values that is performed by the quality verifying unit 18) can be entirely or partially realized by the CPU or a program executed by the CPU or by a hardware using wired logic. The present invention can be similarly applied to a storage device in the form of an optical disk device such as a digital versatile disk (DVD), a compact disk (CD), a magneto optical (MO) disk etc.

As described above, according to an embodiment of the present invention, before actual occurrence of a read error in a storage device, based on a quality of signals fetched from a head, the storage device can grasp whether the storage device is in a condition that is likely to cause occurrence of a failure, and upon determining that the storage device is in a condition that is likely to cause occurrence of a failure, a warning to the effect is reported to a host device. Thus, reliability of the storage device can be increased.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control apparatus that performs, when reading data stored in a storage medium, a correction of a signal read by a head during a Viterbi decoding process of the signal, the control apparatus comprising:

a test executing unit that executes a read test to read data written in a data area that is included separately from a user data area in the storage medium for a number of times;

a signal-quality-value calculating unit to calculate a signal quality value-of the signal based on a status of the correction during the Viterbi decoding process related to the read test executed by the test executing unit; and a signal-quality-value storing unit that stores the calculated signal quality value in a storage area.

2. The control apparatus according to claim 1, wherein the test executing unit executes the read test for each head, for each zone of the storage medium, and for each of different temperature conditions.

3. The control apparatus according to claim 1, wherein the test executing unit executes the read test upon receiving an execute command for the read test from a host device.

4. The control apparatus according to claim 1, wherein the test executing unit executes the read test autonomously and periodically.

5. The control apparatus according to claim 1, wherein the signal-quality-value calculating unit causes the test executing unit to execute the read test during a manufacturing process of the storage device.

6. The control apparatus according to claim 1, further comprising:

a first average-value calculating unit that calculates a first average value of the signal quality values calculated by the signal-quality-value calculating unit based on the status of the correction during the Viterbi decoding process related to the read test;

a first maximum-value fetching unit that fetches a first maximum value of the signal quality values calculated by the signal-quality-value calculating unit based on the status of the correction during the Viterbi decoding process related to the read test; and a recording unit that records the first average value and the first maximum value in a specified area of the storage medium.

7. The control apparatus according to claim 6, wherein the test executing unit executes the read test to read the data written in the data area the number of times more than once, the control apparatus further comprises a second average-value calculating unit that calculates a second average value of the first average values; and a second maximum-value fetching unit that fetches a second maximum value of the first maximum values, and the recording unit records the second average value and the second maximum value in the specified area of the storage medium.

8. The control apparatus according to claim 1, further comprising:

a transferring unit that transfers the calculated signal quality value to a host device.

9. The control apparatus according to claim 1, further comprising:

a verifying unit that verifies whether a quality of the signal shows a sign of degradation, based on the signal quality value stored in the storage area.

10. The control apparatus according to claim 9, further comprising:

a warning notifying unit that notifies, when it is verified that the quality of the signal shows the sign of degradation, a warning to a host device.

11. A storage device that performs, when reading data stored in a storage medium, a correction of a signal read by a head during a Viterbi decoding process of the signal, the storage device comprising:
- a test executing unit that executes a read test to read data written in a data area that is included separately from a user data area in the storage medium for a number of times;
- a signal-quality-value calculating unit calculates a signal quality value of the signal based on a status of the correction during the Viterbi decoding process related to the read test executed by the test executing unit; and
- a signal-quality-value storing unit that stores the calculated signal quality value in a storage area.

12. The storage device according to claim 11, further comprising:
- a verifying unit that verifies whether a quality of the signal shows a sign of degradation, based on the signal quality value stored in the storage area.

13. The storage device according to claim 12, further comprising:
- a warning notifying unit that notifies, when it is verified that the quality of the signal shows the sign of degradation, a warning to a host device.

14. A method of performing, when reading data stored in a storage medium, a correction of a signal read by a head during a Viterbi decoding process of the signal, the method comprising:
- executing a read test to read data written in a data area that is included separately from a user data area in the storage medium for a number of times;
- calculating a signal quality value of the signal based on a status of the correction during the Viterbi decoding process related to the read test executed; and
- storing the calculated signal quality value in a storage area.

* * * * *